United States Patent [19]

Williams et al.

[11] 4,065,026
[45] Dec. 27, 1977

[54] COMPLIANT GROOVED SEALING RING FOR THREADABLY SECURED ASSEMBLY

[75] Inventors: Donald L. Williams, Port Clinton; James T. Baker, Sandusky, both of Ohio

[73] Assignee: General Motors Corporation, Detroit, Mich.

[21] Appl. No.: 736,428

[22] Filed: Oct. 28, 1976

[51] Int. Cl.² .............................................. B65D 55/14
[52] U.S. Cl. .................................... 220/304; 220/288; 277/206 R
[58] Field of Search ............... 220/203, 304, 223, 224, 220/378, 288; 277/206 R, 110

[56] References Cited

U.S. PATENT DOCUMENTS 3,937,358   2/1976   Smith et al. ......................... 220/203

FOREIGN PATENT DOCUMENTS 595,332   7/1925   France .................................. 277/206

Primary Examiner—Robert I. Smith
Attorney, Agent, or Firm—R. L. Phillips

[57] ABSTRACT

In an assembly of two members that are threadably secured and have opposed radially extending sealing surfaces that may experience forced relative tilting there is provided an elastomeric sealing ring that engages these surfaces and has a radially facing circumferential V-shape groove providing lips that are preloaded between the sealing surfaces but do not touch each other on application of a predetermined securing torque and then on forced relative tilting of the members which tends to unseat the ring at some circumferential location the lips at this location remain preloaded while flexing to maintain sealing while at the diametrically opposite location the lips are forced toward full contact.

2 Claims, 3 Drawing Figures

COMPLIANT GROOVED SEALING RING FOR THREADABLY SECURED ASSEMBLY

This invention relates to a complaint grooved sealing ring for providing a sealed joint between two threadably secured members and more particularly to such a sealing ring whose groove is formed with a V-shape so as to provide high compliance during tightening of the mating parts and then on subsequent relative tilting therebetween the ring can follow their movement without parting therefrom.

In a threadably secured assembly such as gas cap for closing the filler neck on an automotive vehicle fuel tank, it is common practice to employ a solid elastomeric O-ring to seal their connection. An example of such an arrangement including a torque limiter mechanism is disclosed in U.S. patent application Ser. No. 516,032 assigned to the assignee of this invention. Typically, the O-ring provides satisfactory sealing under the preload determined by the torque limiter mechanism so long as the opposing seats on the cap and filler neck remain parallel which is the normal case. However, it has been found that such a sealing ring configuration is too limited by its inherent compliance characteristics in maintaining sealing should there occur some forced substantial tilting between the cap and filler neck on the occasion of a severe impact providing a large moment on the cap about an axis transverse to that of the cap and neck.

One well known method of increasing the compliance is to make the O-ring of a softer compound but this is limited by molding defects, swell, compression set and/or long-term heat aging and was found not adequate to the task at handle. It is also known that the actual compression and thus the effective compliance of the O-ring can be further increased by reducing the coefficient of sliding friction between the filler neck sealing surface and the sealing ring which turns with the cap. But even then it was found that the increase in compliance of the conventional solid O-ring could not be made adequate to maintaining sealing in the extreme condition.

The present invention substantially adds to the compliance that can be gained with a softer compound and a lower coefficient of sliding friction by simple modification of the cross-section of the present O-ring but without substantially reducing its cross-sectional strength to the point where the seal could roll and thereby lose its effectiveness in this environment. This is accomplished by a radially outwardly facing circumferential V-shape groove formed in the O-ring having a depth substantially greater than half the thickness of the ring and an included acute angle that provides lips between the seats such that when the predetermined securing torque load occurs and the ring is thereby squeezed between the seats, the lips are forced toward but do not touch each other with the seat parallel. But then on forced substantial tilting of the cap which tends to unseat the ring at some circumferential location the lips at this location remain preloaded to maintain sealing while at the diametrically opposite location the lips are forced toward direct contact.

An object of the present invention is to provide a new and improved compliant grooved sealing ring for a threadably secured assembly.

Another object is to provide in a threadably secured assembly a sealing ring of circular cross-section having a V-shape compliant groove with an included acute angle and a depth substantially greater than half the thickness of the ring to maintain sealing between normally parallel seats when they are forced into a substantially non-parallel condition.

Further objects and advantages of the present invention will be more apparent from the following description and drawing in which.

Figure 1:
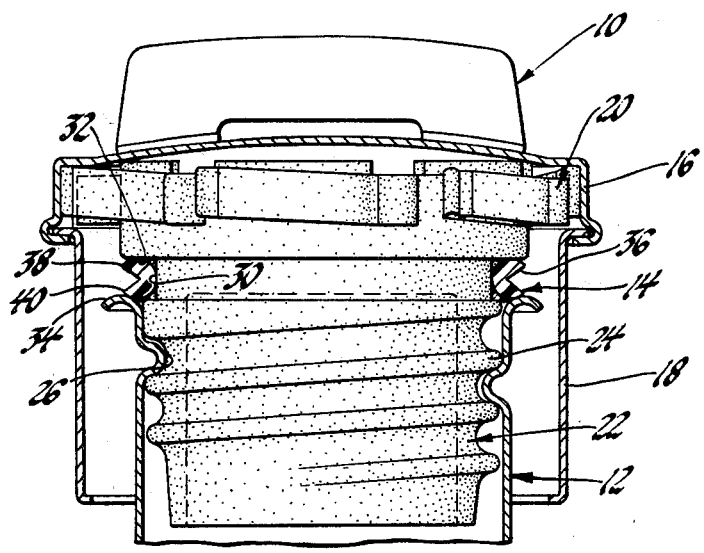
FIG. 1 is a view in vertical section of a fuel filler cap assembly having a preferred embodiment of the sealing ring accoring to the present invention installed but at no load.

Referring to FIG. 1 there is shown a fuel filler cap assembly 10 for the filler neck 12 of an automotive fuel tank (not shown) whose details but for the compliant grooved sealing ring 14 according to the present invention are disclosed in the afore-indentified U.S. patent application Ser. No. 516,032 which is hereby incorporated by reference. The fuel filler cap assembly 10 comprises a sheet metal cover 16 and skirt 18 which are secured together and contain a torque limiter mechanism 20 by means of which the cap is releasably connected to a plastic closure 22. The closure 22 has an external thread 24 which engages an internal thread 26 formed in the filler neck 12, these engaging threads thus providing the means by which the cap is detachably secured to the neck. The torque limited mechanism 20 operates to drivingly connect the cap 10 to the closure 22 in the closing or tightening direction of cap turning up to a predetermined torque load and thereafter permits the cap to free wheel. Alternatively, the torque limiter operates to provide a positive drive connection between the cap and closure in the opening direction of turning to unthread the closure and thus the cap from the filler neck. For a more detailed understanding of the structure and operation of the fuel filler cap assembly including torque limiter, reference may be made to the afore-indentified U.S. patent application Ser. No. 516,032. The cap assembly may further include a pressure vacuum control valve assembly as disclosed in U.S. Pat. No. 3,937,358 but its structure and operation is not necessary to an understanding of the present invention.

In such an arrangement the closure 22 is provided with a circumferential radially outwardly facing groove 30 which provides a radially outwardly extending sealing surface or seat 32 opposite a filler neck sealing surface or seat 34 formed by flaring the edge of the open end of the neck. Typically, a solid O-ring of elastomeric material is mounted in a slightly streched condition in the groove 30 on the cap and on threaded engagement of the cap with the filler neck the O-ring is held by the cap and squeezed between the seats 32 and 34 to seal this joint and thereby prevent leakage of any fumes and liquid from the fuel tank.

Figure 2:
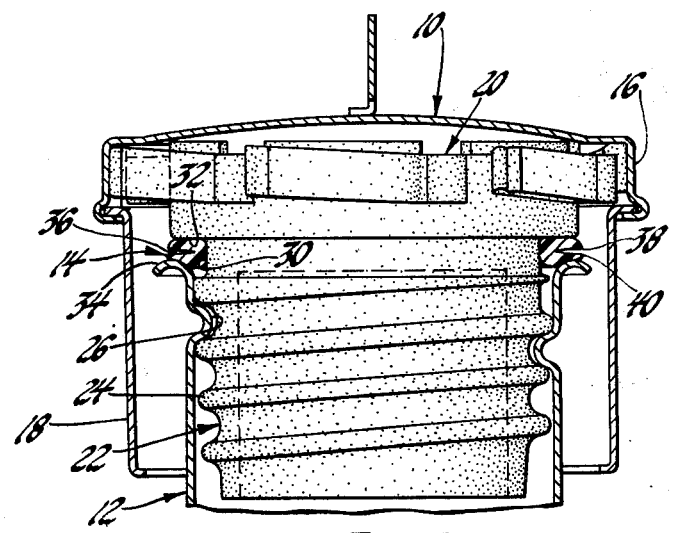
FIG. 2 is a view similar to FIG. 1 but with the sealing ring shown under normal load.
Figure 3:
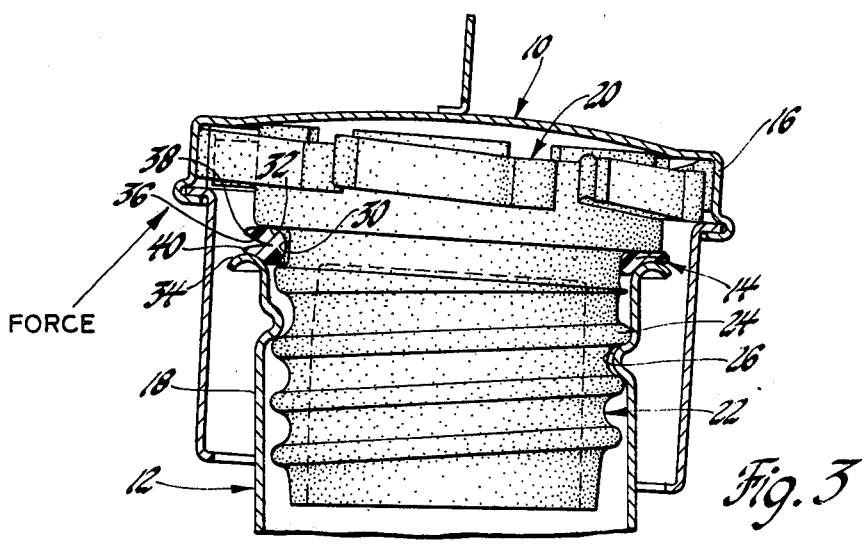
FIG. 3 is a view similar to FIG. 2 but shows substantial tilting of the cap wherein the sealing ring remains completely seated to prevent leakage.

According to the present invention and instead of the typical solid O-ring used for sealing, the sealing ring 14 is formed with a radially outwardly facing circumferential V-shape groove 36 that is bisected by a radial plane through the circular centerline of the seal and has a depth substantially greater than half the thickness or diameter of the ring's circular cross-section and has an included acute angle that provides lips 38 and 40 of substantial length extending radially outward between the respective seats 32 and 34 of the cap and neck. The depth and angle of the groove 36 are determined so that when the release torque load is encountered and the sealing ring is thereby squeezed or preloaded between the seats as shown in FIG. 2, the lips are forced toward but do not touch each other at their ends in the normal preload condition with the substantial cross-sectional resistance to axial loading left by the compliant groove taking the squeeze to assure sealing of the small disparities typically found in the filler neck sealing surface. But then on forced substantial tilting of the cap relative to the filler neck which tends to unseat the sealing ring at some circumferential location, the lips at this location remain preloaded to maintain sealing while at the diametrically opposite location the lips are forced together as shown in FIG. 3, the long cantilevered lips with their cross-sections which gradually taper to the end accommodating such tilt while preventing the seal from rolling.

In an actual usage of the invention it was found that excellent results were obtained where the sealing ring was made of butadiene acrylonitrile base with polyvinyl chloride added sold under compound number E-7-1 by International Packing Corporation, Bristol, New Hampshire. This ring had a hardness range of 60-70 Shore A and had a cross-section diameter of 0.250 inches with the V-shape groove 36 then formed with a 65-75° included angle and provided with a depth of 0.138-0.158 inch, such an arrangement preventing leakage up to and beyond where a 200 pound force was applied at the outside diameter of the cap at a 45° angle to the cap centerline as shown in FIG. 3.

The afore-described preferred embodiment is illustrative of the invention which may be modified within the scope of the appended claims.

We claim:

1. In combination, a pair of tubular members threadably secured together which are forceable into a relatively tilted relationship, said members having axially spaced annular seats, an elastomeric seal ring of circular cross-section arranged between and engaging said seats but free to expand radially, said sealing ring having a radially facing circumferential V-shaped groove with a depth substantially greater than half the thickness of the ring and an included acute angle that provides lips between said seats such that when a predetermined tightening torque is applied to tighten one member on the other and the ring is thereby squeezed between the seats and expands radially while the lips are forced toward but do not touch each other and then on forced substantial relative tilting of the members which tends to unseat the ring at some circumferential location the lips at this location remain preloaded to maintain sealing while at the diametrically opposite location the lips are forced toward direct contact.

2. In combination, a pair of members threadably secured together which are forceable into a relatively tilted relationship, said members having axially spaced annular seats, an elastomeric sealing ring of circular cross-section arranged between and engaging said seats but free to expand radially, said sealing ring having a radially outwardly facing circumferential V-shape groove bisected by a radial plane through the circular centerline of the sealing ring, said groove having a depth substantially greater than half the thickness of the ring and an included acute angle that provides lips between said seats such that when a predetermined tightening torque is applied to tighten one member on the other and the ring is thereby squeezed between the seats and expands radially while the lips are forced toward but do not touch each other and then on forced substantial relative tilting of the members which tends to unseat the ring at some circumferential location the lips at this location remain preloaded to maintain sealing while at the diametrically opposite location the lips are forced toward direct contact.

* * * * *